…

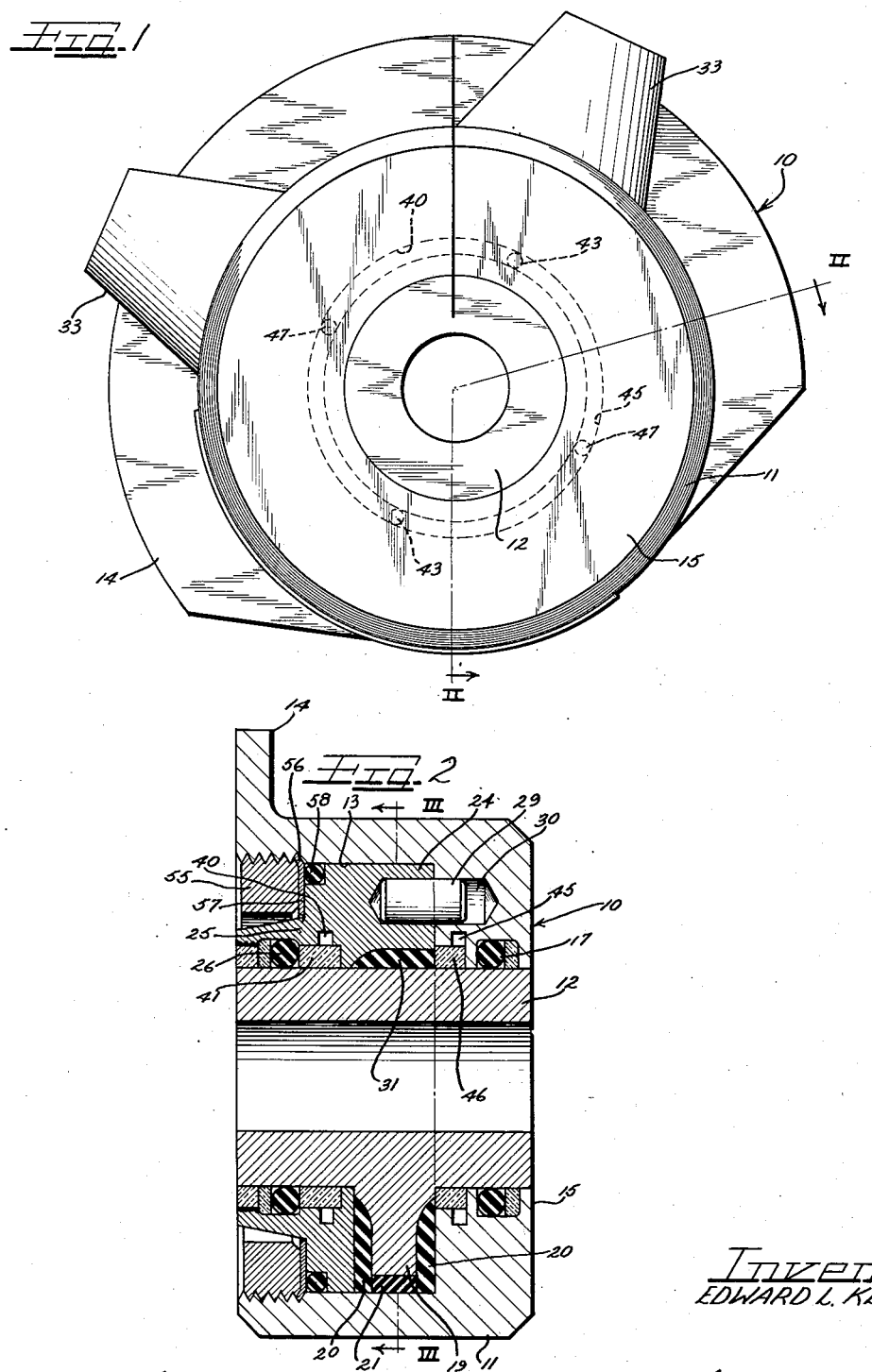

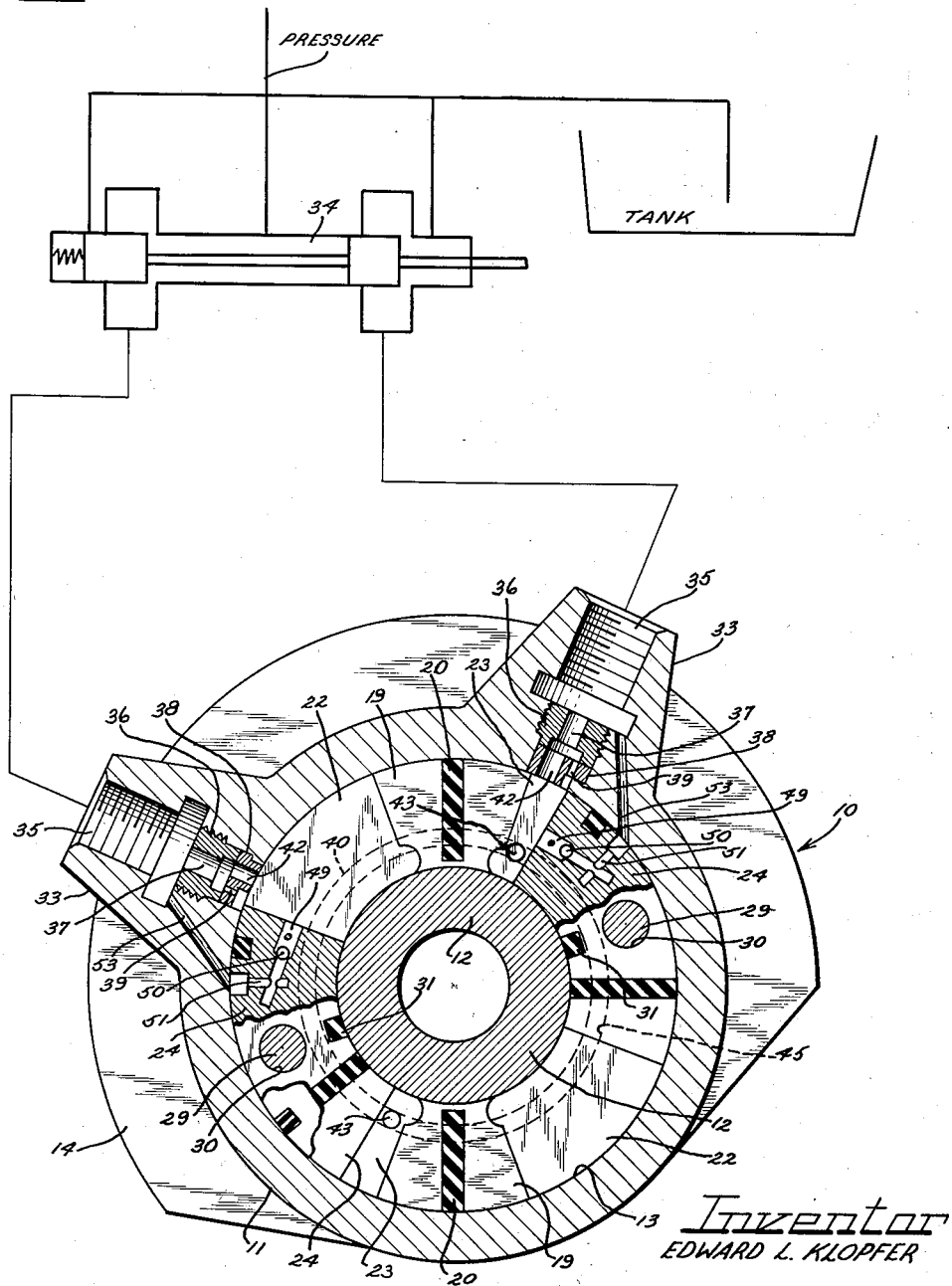

United States Patent Office 2,969,778
Patented Jan. 31, 1961

2,969,778
HYDRAULIC ROTARY ACTUATOR

Edward L. Klopfer, North Evans, N.Y., assignor to Houdaille Industries, Inc., Buffalo, N.Y., a corporation of Michigan Filed Apr. 15, 1957, Ser. No. 652,951

3 Claims. (Cl. 121—99)

This invention relates to improvements in actuators for actuating the movable members of aircraft and the like.

A principal object of the invention is to provide a simple and compact form of rotary actuator of a novel and improved construction for the movable parts of aircraft.

A further object of the invention is to provide a novel form of rotary actuator constructed with a view toward utmost compactness and simplicity, and so arranged as to damp movement of the rotary piston of the actuator toward the end of its travel, and to accommodate full speed response of the rotary piston to move in an opposite direction away from the fixed abutment of the actuator.

Still another object of the invention is to provide a simplified form of rotary damper in which the rotary piston of the damper closes off the actuating ports toward the end of its travel, and damping orifices damp movement of the piston at the end of its travel, in which a check valve and by-pass passageway arrangement is provided to accommodate full speed response to movement of the piston away from the stationary abutment of the damper.

Still another object of the invention is to provide an improved form of rotary actuator having a hollow rotary piston in which the load is conducted from one chamber to the other by annular passageways concentric with the axis of the rotary piston.

These and other objects of the invention will appear from time to time as the following specification proceeds and with reference to the accompanying drawing wherein:

Figure 1 is an end view of a rotary actuator contructed in accordance with the invention;

Figure 2 is a vertical sectional view taken substantially along lines II—II of Figure 1; and Figure 3 is a sectional view taken substantially along line III—III of Figure 2 with the parts of the actuator in a position shown in Figure 2 diagrammatically showing a fluid control circuit to the actuator.

In the embodiment of the invention illustrated in the drawings, reference character 10 designates generally a rotary hydraulic actuator constructed in accordance with the invention and having a housing 11 having flange 14 extending thereabout for a portion of a circumference thereof for connection with a stationary part of an aircraft, and having a hollow rotary wing shaft or piston 12 carried within said housing and adapted to be connected with a movable part of an aircraft as by internal splines (not shown) to actuate a movable part of an aircraft.

The housing 11 is generally cylindrical in form and has a cylindrical inner wall 13 having an end flange 15 extending inwardly of said inner wall along one end of said housing and having the wing shaft or rotary piston 12 rotatably mounted therein and sealed thereto as by suitable sealing means, such as an O-ring seal 17.

The rotary piston 12, commonly called a wing shaft, is provided with a pair of diametrically opposed laterally projecting vanes or wings 19 having slidable engagement with the cylindrical wall 13 of the housing 11 and sealed thereto as by resilient radial seals 20 extending along each side of each vane, and a wiper seal 21 extending across the vane, intermediate the ends thereof.

Working chambers 22 and 23 are defined by opposite faces of diametrically opposed fluid reaction members or abutments 24 and the adjacent faces of the vanes 19. The abutments 24 are herein shown as being formed integrally with an annular disk like portion 25 extending about the opposite end of said wing shaft 12 from the end flange 15 and closing the opposite end of said housing from the end flange 15. An O-ring sealing means 26 is provided to seal the annular portion 25 to the wing shaft 12.

The abutments 24 and annular portion 25 are maintained in position within the housing 11 in engagement with the cylindrical wall 13 as by locating pins 29 mounted in said abutments and extending within drilled holes 30 in the end flange 15. The abutments 24 extend radially inwardly from the cylindrical wall 13 of the housing 11 into engagement with the wing shaft 12 between the wings thereof and are sealed thereto as by transverse wiping seals 31.

The housing 11 is provided with two circumferentially spaced lugs 33 extending outwardly from the outer wall thereof and having inlet passageways 35 leading radially therealong through the wall 13 of the housing. The inlet passageways 35 are shown as being threaded for connection with hydraulic control lines connected with a hydraulic control valve 34, admitting fluid under pressure through one inlet to rotate the wing shaft 12 in one direction and at the same time releasing fluid from the second inlet to accommodate rotatable movement of the wing shaft. The control valve 34 is diagrammatically shown as being a well known form of spool valve, but may be of any well known form, and is no part of the present invention so need not herein be shown or described further.

Each inlet 35 has a sleeve-like insert 36 threaded therein and having a main fluid passageway 37 leading therethrough. The insert 36 abuts an orifice member 38 at its inner end having a damping orifice 39 leading therethrough, circumferentially spaced from a main fluid passageway 42 leading through said orifice member, and spaced closer to the adjacent face of the associated abutment 24 than the main fluid passageway 42. Thus upon movement of the wing 19 toward an adjacent abutment 24 the wing will first close off the main fluid passageway 42. The respective damping orifice 39 will then damp travel of the wings 19 as they approach the faces of the abutments 24.

The working chambers 23 are connected together to supply fluid under pressure to the two wings or vanes 19 through an annular passageway 40 formed in the annular portion 25 and extending thereabout. The passageway 40 opens toward a bearing ring 41 on the annular disk-like portion between the seals 26 and 31. Two diametrically opposed holes 43 are drilled axially through the face of the annular portion 25 into communication with the annular passageway 40.

The working chambers 22 are connected together by a similar annular passageway 45 formed in an inner face of the end flange 15, and opening toward a bearing 46 carried in said end flange, and forming a bearing for said wing shaft. Two diametrically opposed holes 47 drilled into said end flange from the inner face thereof in communication with the annular passageway 45, are provided to afford communication between the working chambers 22.

A means is provided to accommodate full speed response to movement of the vanes wing 19 away from their associated abutments, which is herein shown as being a passageway 49 leading into each abutment 24 from the face thereof adjacent the associated inlet passageway 42. Each passageway 49 has a check valve 50 therein blocking the flow of fluid into said passageway from the associated working chamber, as the vane 19 approaches the associated abutment 24. Each passageway 49 has communication with the inlet 35 through a radial passageway 51 drilled into the abutment 24 from the outer face thereof, and intersecting the passageway 49. A by-pass passageway 53 affords communication from the inlet 35 to the radial passageway 51. Thus, as fluid under pressure is admitted to an inlet 35, the wings are free to move away from the abutments 24 and a limited amount of fluid under pressure may pass through the fluid passageway 49 out through the face of an associated abutment 24, to thereby provide full speed response to fluid entering the associated inlet 35.

An externally threaded nut or collar 55 is threaded within the opposite face of the housing 11 from the end flange 15 to retain the abutments 24 within the housing 11. The collar 55 is shown as abutting an annular washer 56 and as maintaining said washer in engagement with an end face 57 of the annular disk-like portion 25, connecting the abutments 24 together, and as retaining an O-ring seal 58 to the inner cylindrical wall 13 of the housing 11.

It may be seen from the foregoing that a simplified form of rotary hydraulic actuator has been provided in which the wing shaft vane closes off its actuating ports near the end of its travel, in either direction of travel, and that as an actuating port is closed off the damping orifice 39 arrests travel of the vane.

It may further be seen that full speed response away from the associated vane is attained by the by-pass passageway 49 communicating with the inlet 35 through the abutment face facing an adjacent vane 19, with the check valve 50 blocking the passage of fluid through the by-pass passageway, as the vane approaches its abutment.

It may still further be seen that a simplified and novel fluid passageway arrangement is provided, accommodating the use of a hollow wing shaft and connecting complementary working chambers together, and that this passageway means is in the form of an annular passageway in the annular hub portion for the abutments 24 and in the end flange of the housing for the actuator.

It will be understood that various modifications and variations of the present invention may be effected without departing from the spirit and scope of the novel concepts thereof.

I claim as my invention:

1. In a hydraulic rotary actuator, a housing having a cylindrical inner wall, a rotary piston within said housing having at least one vane having slidable engagement with said wall, at least one fluid reaction abutment within said housing having engagement with and fixed from movement with respect to said cylindrical wall and having slidable engagement with said piston, an inlet into said housing on one side of said vane and spaced circumferentially from said abutment, a second inlet into said housing on the opposite side of said vane, said vane closing off said first inlet, upon the admission of fluid under pressure to said second inlet, toward the end of travel of said vane, a damping orifice between said inlet and said abutment, damping movement of said vane toward the end of its travel, and a passageway leading through the face of said abutment adjacent said vane, and having communication with said inlet, said passageway having a check valve therein blocking the passage of fluid into said passageway from the face thereof and accommodating full speed response to movement of said vane away from said abutment upon the admission of fluid under pressure through said first inlet.

2. In a rotary hydraulic actuator for aircraft and the like, a housing having a cylindrical inner wall, a rotary piston within said housing having at least one vane sealed to and having slidable engagement with said inner wall, two spaced fluid reaction abutments within said housing fixed from movement with respect thereto and having slidable engagement with said piston, spaced inlets into said housing through said cylindrical wall, spaced circumferentially from said abutments on opposite sides of said vane, said vane closing off said inlets near the ends of its travel, damping orifices in said housing spaced circumferentially along the wall of said housing inwardly of said inlets toward said abutments and damping movement of said piston toward an associated abutment, each of said abutments having a passageway leading thereinto from the face thereof adjacent an associated vane and having communication with said inlets, and check valves in said passageways blocking the flow of fluid into said passageways as a vane approaches an associated abutment, and accommodating the flow of fluid out through said passageways to afford full speed response of said vane away from the associated abutment.

3. In a hydraulic actuator for aircraft and the like, a housing having a cylindrical inner wall, a rotary piston within said housing having diametrically opposed vanes slidably engageable with said inner wall and sealed thereto, diametrically opposed fluid reaction abutments abutting said inner wall between said vanes and extending inwardly therefrom to said piston, circumferentially spaced inlets leading into said housing on opposite sides of one of said vanes, annular passageways having communication with said inlets and connecting complemental working chambers together, said one vane closing off said inlets upon movement of said vane toward said abutments, damping orifices disposed between said inlets and said abutments and damping movement of said vanes as they approach said abutments, each of said abutments having a passageway leading thereinto from the face thereof adjacent said one vane and having communication with said inlet, and check valves in said passageways blocking the flow of fluid into said abutments through the adjacent faces thereof and accommodating the flow of fluid out through said abutments through said by-pass passageways upon movement of said one vane away from said abutments.

References Cited in the file of this patent

UNITED STATES PATENTS

| | | |
|---|---|---|
| 1,892,187 | Drennon | Dec. 27, 1932 |
| 2,164,876 | Horlacher | July 4, 1939 |
| 2,780,432 | Shafer | Feb. 5, 1957 |
| 2,798,462 | Ludwig et al. | July 9, 1957 |
| 2,811,142 | Shafer | Oct. 29, 1957 |

FOREIGN PATENTS

| | | |
|---|---|---|
| 635,106 | Great Britain | Apr. 5, 1950 |
| 657,873 | Great Britain | Sept. 26, 1951 |